United States Patent Office 3,150,160
Patented Sept. 22, 1964

3,150,160
METAL SALTS AND CHELATES OF CYCLOHEXYL OR CYCLOPENTYL TRIAMINO PENTA-ACETIC ACIDS
Martin Dexter, White Plains, N.Y., assignor to Geigy Chemical Corporation, Greenburgh, N.Y., a corporation of Delaware
No Drawing. Filed Oct. 17, 1960, Ser. No. 62,845
16 Claims. (Cl. 260—439)

This invention relates to novel polyaminopolycarboxylic acids and their metal chelates and particularly to alicyclic triamino pentaacetic acids which exhibit sequestering activity and are useful as chelating agents. The invention also pertains to the new starting materials used in the production of the subject compounds.

It is known that organic nitrogen compounds with more than one acetic acid radical attached to a basic nitrogen atom have the property of preventing the formation of precipitates of the alkaline earth and heavy metal salts or of redissolving precipitates of these metals which have already formed.

Especially outstanding among the group of such synthetic polyaminopolycarboxylic acids are ethylenediaminetetraacetic acid (EDTA), diethylenetriaminopentaacetic acid (DTPA) and cyclohexyldiaminotetraacetic acid (CDTA).

The commercial applications of these acids are numerous and varied. In industry, they are used in the manufacture of synthetic rubber, of soaps and synthetic detergents, in textile and food processing, etc. In agriculture, their iron chelates are useful for the treatment of iron deficiencies in certain economic crops. In medicine, they are effective in conditions of poisoning with radioactive and other toxic metals. Numerous other applications of these acids and their metal chelates have been described in the scientific and commercial literature.

The unexpected and surprising finding has now been made that certain alicyclic triaminopentaacetic acid compounds possess complex-forming or chelating properties in a highly favorable degree.

The new chelating agents which may be designated more specifically as N,N',N',N'',N''-pentacarboxymethyl-N-($\beta$-aminoethyl) - 1,2 - diaminocycloalkanes, correspond to the formula:

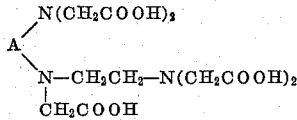

wherein A represents a cycloalkyl nucleus, which is 1,2-disubstituted, i.e., it carries the above indicated substituents in ortho position to one another. Compounds containing cyclopentyl or cyclohexyl nuclei constitute the preferred embodiments, and especially preferred are cyclohexyl compounds.

The new alicyclic triamino pentaacetic acid compounds are obtained from N-($\beta$-aminoethyl) - 1,2 - diaminocycloalkanes of the formula

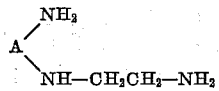

wherein A has the meaning given above, by treatment with at least five molecular proportions of reactive acetic acid derivatives. These derivatives may contain instead of the free carboxyl group, modified carboxyl groups which are finally converted to the free groups. As examples of substituted acetic acids reactive at the $\alpha$-position may be mentioned the monohalogen acetic acids, such as, monochloracetic acid and monobromacetic acid.

By compounds with modified carboxyl groups are to be understood the salts, esters, amides and nitriles of these monohalogen acetic acids. The conversion of the modified carboxyl groups to the free carboxyl groups is brought about by acid or, preferably, alkaline hydrolysis. Other practicable methods of carboxymethylation involve the use of formaldehyde cyanohydrin or mixtures of alkali cyanides and formaldehyde or hydrogen cyanide and formaldehyde. See U.S. Pat. Nos. 2,387,735 and 2,845,457.

The N-($\beta$-aminoethyl) - 1,2 - diaminocycloalkanes serving as starting materials for the manufacture of the new compounds are obtained by reacting together 2-aminocycloalkyl sulfuric acid and ethylenediamine. They may also be prepared by reacting cycloalkyl-1,2-diamine with ethyleneimine or with $\beta$ - aminoethylchloride. These starting polyamines or intermediates for the manufacture of the subject compounds may also be used as intermediates in the synthesis of corrosion inhibitors and surfactants. For instance, the latter may be prepared by reacting a long chain fatty acid with these cycloalkyl triamine compounds at an elevated temperature to form the corresponding monoamides or imidazolines. In addition, these starting materials without further chemical modification find application as epoxy hardeners.

The new pentaacetic acid compounds are white powders, the alkali salts of which are exceedingly soluble in water. As stated above, they have utility as chelating agents. Their usefulness as chelating agents is manifold. For instance, it has been found that the cyclohexyl triamino pentaacetic acid chelates iron as well as or better than CDTA, and certainly better than DTPA and EDTA. When complexed with iron to form an iron chelate, it has application as a hematinic to supply iron to the animal organism in order to increase the hemoglobin of the blood. Thus complexed, it may also be used as remedial in conditions known as iron chlorosis in certain economic crops.

This compound, which is relatively non-toxic, has also been found effective in its free acid form or as calcium complex or chelate for the removal from the animal organism of radioactive metals, such as Pu, Y, Sr; and toxic heavy metals, such as rare earths, Cu, Fe, Pb, etc. Thus, it is useful in conditions of metal poisoning.

The subject compounds, preferably in the form of water soluble salts with a monovalent cation, such at alkali metal salts and, especially, one of the sodium salts, can also be used as textile dyeing assistants, in the manufacture of soaps and synthetic detergents and particularly also as stabilizers for ascorbic acid in fruit juices. Furthermore, they may find application as intermediates in the synthesis of plasticizers. For instance, by reaction of the acid groups with alcohols or amines the corresponding esters or amides can be produced which exhibit plasticizing activity.

The following examples to which, however, the invention is not restricted, give details of the preparation of the new compounds. The parts are given as parts by weight and temperatures are in degrees centigrade.

*Example 1.—Preparation of N-($\beta$-Aminoethyl)-1,2-Diaminocyclohexane*

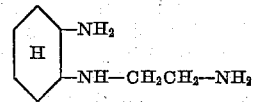

390 parts of 2-aminocyclohexyl sulfuric acid, 860 parts of 86.5% ethylenediamine and 100 parts of water are heated to 180° in a stainless steel autoclave in a period of two hours. After reaching this temperature the autoclave and its contents are cooled to room temperature, the reaction mixture is diluted with 1,000 parts of water and made alkaline with 320 parts of 50% sodium hydroxide. The sodium sulfate that crystallizes from solution is removed by filtration. The filtrate is distilled under reduced pressure. 240 parts of N-(β-aminoethyl)-1,2-diaminocyclohexane is contained in the fraction that distills at 78–79° at 0.5 mm. pressure.

The purity as determined by titration with perchloride acid in an acetic acid solution is 97.5%. Crystalline salts may be obtained by the addition of either hydrochloric or sulfuric acids to an aqueous solution of the amine and evaporation to dryness.

Analysis:
Calc'd for $C_8H_{19}N_3 \cdot 3HCL$ (265): N, 15.7. Found: N, 15.5.
Calc'd for $C_8H_{19}N \cdot 1.5H_2SO_4$ (304): N, 13.9. Found: N, 14.0.

If in the above example, 2-aminocyclopentyl sulfuric acid is taken, the corresponding N-(β-aminoethyl)-1,2-diaminocyclopentane is obtained in an analogous manner.

*Example II.—Preparation of N,N',N',N'',N''-Pentacarboxymethyl-N-(β-Aminoethyl) - 1,2 - Diaminocyclohexane*

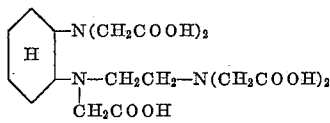

39.2 parts of N-(β-aminoethyl) - 1,2 - diaminocyclohexane, 200 parts of water and 204 parts of sodium chloroacetate are added to a beaker equipped with an agitator, a bath for heating or cooling, pH indicating electrodes and a thermometer. 140 parts of 50% sodium hydroxide are added over a period of four hours keeping the temperature between 45° and 70° and the pH between 12 and 13. Titration of the solution for chelating activity after reaction completion shows that it contains 96 parts of the pentasodium salt of N,N',N',N'',N'' - pentacarboxymethyl - N -(β - aminoethyl)-1,2-diaminocyclohexane.

The solution of the sodium salt of the chelating agent can be used directly for many applications where the presence of sodium chloride and other impurities does not interfere. For other applications it is desirable to use the chelating agent in its free acid form. It is possible to isolate the compound by the following ion exchange procedure.

583 parts of the aqueous solution of the above salt of the chelating agent is acidified with 170 parts of 37% hydrochloric acid and distilled to remove 100 parts of water. Sodium chloride separates from the solution and is removed by filtration. The salt is slurried in a small amount of water, filtered again and the filtrates are combined. The partially de-salted solution is allowed to flow through an ion exchange column containing Dowex 50 (a sulfonated cross-linked polystyrene resin). The column is washed with water to remove hydrochloric acid and then with 0.2 M ammonia to recover the chelating agent. The eluate is distilled under reduced pressure to concentrate the residue to 360 parts. To this concentrate is added 110 parts of $Pb(AC)_2 \cdot 3H_2O$ in 300 parts of water. The slurry thus obtained is heated under reduced pressure to evaporate water and acetic acid. The solid residue is slurried with 500 parts of hot water, cooled, filtered, washed with a small amount of cold water, and suspended in 500 parts of water. After saturation with hydrogen sulfide the lead sulfide is removed by filtration and water is distilled from the filtrate under reduced pressure to reduce the weight of the still-pot residue to 100 parts. The desired product is precipitated by the addition of 500 parts of methanol to the aqueous concentrate and pouring the resulting methanolic solution into 1800 parts of dry isopropanol. 45 parts of N,N',N',N'',N''-pentacarboxymethyl - N - (β-aminoethyl)-1,2-diaminocyclohexane are obtained after filtration and drying to constant weight.

Analysis:
Calc'd for $C_{18}H_{29}N_3O_{10}$ (447): N, 9.4. Found: N, 9.0.
Total acidity: Calc'd 11.2 meg./g. Found: 10.7 meg./g.

Titration with zinc chloride shows that 139 mg. of zinc is chelated by each gram of the compound. The calculated value is 146 mg.

If in the above example N-(β-aminoethyl)-1,2-diaminocyclopentane is used, the corresponding N,N',N',N'',N''-pentacarboxymethyl-N-(β-aminoethyl) - 1,2 - diaminocyclopentane is obtained in an analogous manner.

*Example III.—Preparation of Iron Chelates*

The ferric chelate is prepared by the addition of 2.70 parts of ferric chloride hexahydrate to a solution of 4.47 parts of N,N',N',N'',N''-pentacarboxymethyl-N-(β-aminoethyl)-1,2-diaminocyclohexane in 10 parts of water. 2 parts of sodium hydroxide are used to adjust the solution to neutrality. A dry powder can be obtained by evaporation in vacuo. Other iron salts, such as ferric nitrate, ferric sulfate, etc. can be used in place of ferric chloride. Freshly precipitated iron hydroxide is used to form the iron chelate when it is desired to have a salt free product.

The ferrous chelate can be prepared using ferrous sulfate. In this preparation, an oxygen-free atmosphere must be used to prevent oxidation to the ferric chelate.

*Example IV.—Preparation of the Calcium Chelate*

The calcium chelate is prepared by reacting 1.00 part of calcium carbonate with 4.47 parts of N,N',N',N'',N''-pentacarboxymethyl-N-(β-aminoethyl) - 1,2 - diaminocyclohexane in 10 parts of water. After the calcium carbonate has dissolved the solution is neutralized with 2 parts of sodium hydroxide. The sodium salt of the calcium chelate may be obtained as a white powder by evaporation of the solution to dryness under reduced pressure. In place of calcium carbonate other sources of calcium can be used, such as calcium oxide, calcium chloride, calcium nitrate, etc.

Corresponding chelates may, of course, be prepared from the cyclopentane compound of this invention.

Water-soluble chelate complexes of the subject compounds, in addition to calcium and iron mentioned above, may be formed with other polyvalent metals, namely, the divalent or higher than divalent metals. Thus, embraced among these chelate complexes of these sequestering agents are those of divalent metals such as the alkaline earth metals as barium, calcium, strontium, with magnesium included among them, and the iron group metals as iron, nickel, and cobalt, and others such as copper, zinc, and manganese, as well as other divalent metals. The chelate complexes of higher than divalent metals are not only those with metals such as iron, cobalt, and manganese and others like them that also exist in the divalent state, but also those with metals that are only trivalent such as aluminum, as well as those of metals of any other valence. It is possible to have the chelate complex of any of the metals so long as it is divalent or higher. These chelate complexes with iron and the various other metals referred to above are water-soluble.

What is claimed is:
1. A member of the class consisting of alicyclic triamino pentaacetic acid compounds of the formula:

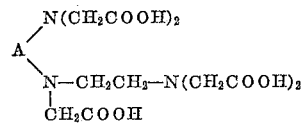

wherein A represents 1,2-disubstituted cycloalkyl nuclei selected from the group consisting of cyclopentyl and cyclohexyl; their water-soluble salts with monovalent cations; and their water-soluble chelates with polyvalent metals.

2. Aqueous solutions of the members of the class defined in claim 1.

3. Alicyclic triamino pentaacetic acid compounds of the formula:

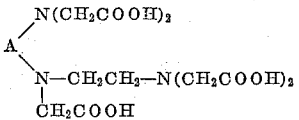

wherein A represents 1,2-disubstituted cycloalkyl nuclei selected from the group consisting of cyclopentyl and cyclohexyl.

4. N,N',N',N'',N''-pentacarboxymethyl - N - ($\beta$-aminoethyl)-1,2-diaminocyclohexane.

5. N,N',N',N'',N''-pentacarboxymethyl - N - ($\beta$-aminoethyl)-1,2-diaminocyclopentane.

6. Water-soluble chelates with polyvalent metals of alicyclic triamino pentaacetic acid compounds of the formula:

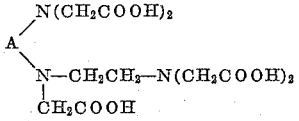

wherein A represents 1,2-disubstituted cycloalkyl nuclei selected from the group consisting of cyclopentyl and cyclohexyl.

7. A water-soluble metal chelate of N,N',N',N'',N''-pentacarboxymethyl - N - ($\beta$-aminoethyl)-1,2-diaminocyclohexane with a polyvalent metal.

8. A water-soluble metal chelate of N,N',N',N'',N''-pentacarboxymethyl - N - ($\beta$-aminoethyl)-1,2-diaminocyclopentane with a polyvalent metal.

9. Water-soluble iron chelates of alicyclic triamino pentaacetic acid compounds of the formula:

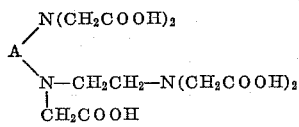

wherein A represents 1,2-disubstituted cycloalkyl nuclei selected from the group consisting of cyclopentyl and cyclohexyl.

10. A water-soluble iron chelate of N,N',N',N'',N''-pentacarboxymethyl - N - ($\beta$-aminoethyl)-1,2-diaminocyclohexane.

11. Water-soluble ferric chelates of alicyclic triamino pentaacetic acid compounds of the formula:

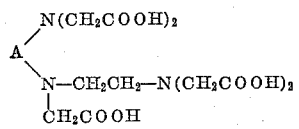

wherein A represents 1,2-disubstituted cycloalkyl nuclei selected from the group consisting of cyclopentyl and cyclohexyl.

12. A water-soluble ferric chelate of N,N',N',N'',N''-pentacarboxymethyl - N - ($\beta$-aminoethyl)-1,2-diaminocyclohexane.

13. Water-soluble ferrous chelates of alicyclic triamino pentaacetic acid compounds of the formula:

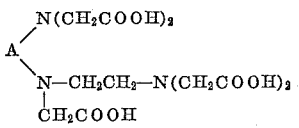

wherein A represents 1,2-disubstituted cycloalkyl nuclei selected from the group consisting of cyclopentyl and cyclohexyl.

14. A water-soluble ferrous chelate of N,N',N',N'',N''-pentacarboxymethyl - N - ($\beta$-aminoethyl)-1,2-diaminocyclohexane.

15. Water-soluble calcium chelates of alicyclic triamino pentaacetic acid compounds of the formula:

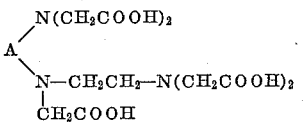

wherein A represents 1,2-disubstituted cycloalkyl nuclei selected from the group consisting of cyclopentyl and cyclohexyl.

16. A water-soluble calcium chelate of N,N',N',N'',N''-pentacarboxymethyl - N - ($\beta$-aminoethyl)-1,2-diaminocyclohexane.

References Cited in the file of this patent

UNITED STATES PATENTS

| | | |
|---|---|---|
| 2,396,938 | Bersworth | Mar. 19, 1946 |
| 2,788,371 | Scudi | Apr. 9, 1957 |
| 2,808,438 | Mizzoni | Oct. 1, 1957 |
| 2,816,060 | Carter | Dec. 10, 1957 |
| 2,830,887 | Bersworth | Apr. 15, 1958 |
| 2,906,762 | Knell | Sept. 29, 1959 |
| 2,936,316 | Young | May 10, 1960 |
| 3,051,563 | Bersworth | Aug. 28, 1962 |

FOREIGN PATENTS

| | | |
|---|---|---|
| 824,275 | Great Britain | Nov. 25, 1959 |

OTHER REFERENCES

Anderegg et al.: Helvetica Chimica Acta, vol. 42, pages 827–836, 1959.